Patented Mar. 4, 1941

2,233,970

UNITED STATES PATENT OFFICE 2,233,970

QUINOLINE COMPOUND AND PROCESS OF MAKING THE SAME

Hans Andersag, Stefan Breitner, and Heinrich Jung, Wuppertal-Elberfeld, Germany, assignors to Winthrop Chemical Company, Inc., New York, N. Y., a corporation of New York No Drawing. Application September 22, 1938, Serial No. 231,166. In Germany October 7, 1937

21 Claims. (Cl. 260—288)

The present invention relates to new and valuable quinoline compounds and to a process of making the same.

In the U. S. Patents 1,747,531, 1,903,196 and 1,938,047 amino quinolines and substitution products thereof being substituted in the amino group by a basic radical have been described. These quinoline compounds are distinguished by their action against blood-parasites especially against the parasites of the malaria.

We have found that quinoline compounds containing at least in the 4-position an amino group which is substituted by a basic radical and in 7-position a halogen atom or the methyl group are especially effective against the a-sexual form of the parasites of the malaria. Preferred substituents in 7-position are the halogens.

As suitable basic radicals substituting the amino group in 4-position there come into consideration aminoalkyl or alkylaminoalkyl radicals containing one or several strong basic amino groups. The basic radical may also contain cyclic parts, its carbon chain may be interrupted by other atoms, for instance, by oxygen, nitrogen or sulfur.

The effect produced by the above mentioned radicals in 4- and 7-position is in general not influenced by the presence of substituents in other positions. The 2-position, however, should be unsubstituted. A substituent, for instance, an alkyl, aryl or aralkyl group in 3-position is in most cases avdantageous. Compounds being substituted in 4- and 7-position as above indicated and bearing in 3-position an alkyl, aryl or aralkyl group are therefore especially valuable.

Our new quinoline compounds can be obtained in several ways. For instance, the amino group of 4-aminoquinolines bearing in 7-position a further substituent can be substituted by a basic radical by acting upon the amino compound with an ester of a basic alcohol capable of being converted.

Such esters are, for instance, the esters with hydrohalic acids or sulfonic acids or the salts thereof. A modification consists in that the basic alcohols themselves are condensed with the heterocyclic amine with an addition of an agent effecting condensation (compare, for instance, German specifications 602,049 and 650,491).

The new quinoline compounds can also be obtained in an advantageous manner by converting quinoline derivatives having in the 7-position a substituent of the above mentioned kind and in 4-position a substituent which can be replaced preferably by a halogen or a sulfonic acid group, with a primary or secondary amine being substituted by a basic radical. The conversion can be facilitated by adding compounds which favor the conversion, for instance, phenols, iodides, copper powder and the like. In the quinoline compounds thus obtained, the substituent, being present in 7-position can be transformed later, if necessary, into halogen. Thus, for instance, a nitro group can be transformed into an amino group and the latter into halogen.

The manufacture of our new compounds can also be carried out in several steps, for example, by first acting upon 4-aminoquinoline compounds with an alkylenedihalide or an alkylene oxide and converting the halogen or hydroxy alkyl compound, the latter, if necessary, after conversion into the alkylhalogen compound into an amino alkyl compound by reacting thereupon with primary or secondary amines. A further way consists in that quinoline derivatives having in 4-position a substituent capable of being replaced are reacted with amino alcohols or reactive esters thereof, whereby hydroxyalkylamino compounds, their esters respectively, are obtained. The latter, if necessary, after converting the hydroxy compounds into their reactive esters, are converted into the corresponding amino alkyl compounds by reacting thereupon with primary or secondary amines.

The new quinoline compounds yield with acids neutral colorless salts. The salts with hydrohalic acids, sulfuric acid, phosphoric acids and lower organic acids such as acetic acid, lactic acid, tartaric acid, gluconic acid, citric acid and alkylsulfonic acids are in general soluble in water. Salts being sparingly soluble or insoluble in water which are valuable for solid preparations are obtained with acids mentioned in the U. S. Letters Patent 1,872,826 as, for instance, methylene-bis-hydroxynaphthoic acid, 2.4-dihydroxybenzoic acid and the like.

The following examples illustrate our invention without, however, restricting it thereto:

*Example 1*

105 g. of 4.7-dichloroquinoline (M. P. 93–94°) are heated with 200 g. of 1-diethylamino-4-aminopentane for 7 hours in an oil bath to 180° while stirring, until a test portion dissolved in diluted nitric acid does not show a precipitation with sodium acetate solution. The mixture is dissolved in diluted acetic acid and made alkaline by adding sodium lye. The base is extracted with ether, dried with potassium carbonate, the ether removed by distillation and the residue fractionated. The 4-(5'-diethylaminopentyl-2'- amino)-7-chloroquinoline (B. P. 212–214°/0.2 mm.) is obtained. On cooling the compound solidifies crystalline. It melts, recrystallized from benzene, at 88°. Combined with 2.4-dihydroxybenzoic acid the base yields a colorless crystalline salt (M. P. 228–229°). The picrate of the base melts at 207°.

In a corresponding manner from 4.7-dichloroquinoline and 1-diethylamino-2-aminoethane the 4-diethylaminoethylamino-7-chloroquinoline (B. P. 190–195°/3 mm.) is obtained. The hydrohalic acid salt melts at 266° and dissolves easily in water.

From 4.7-dichloroquinoline and 1-diethylamino-4-aminobutane the 4-diethylaminobutylamino-7-chloroquinoline (B. P. 215°/0.5 mm.) is obtained, which, on cooling, solidifies.

From 4-chloro-7-methylquinoline (B. P. 135°/10 mm.) and 1-diethylamino-4-aminopentane the 4-(5'-diethylaminopentyl-2'-amino)-7-methylquinoline (B. P. 199°/0.3 mm.) is obtained.

From 4-chloro-6.7-dimethylquinoline (B. P. 149°/6 mm.) and 1-diethylamino-4-aminopentane the 4-[5'-dimethylaminopentyl-(2')-amino]-6.7-dimethylquinoline (B. P. 188°/0.15 mm.) is obtained.

By heating 4-chloro-7-iodoquinoline (F. P. 101°) with 1-diethylamino-4-aminopentane to 160° C. the 4-[5'-diethylaminopentyl-(2')-amino]-7-iodoquinoline is obtained, which melts at 121° when recrystallized from ether-petroleum ether.

*Example 2*

22 g. of 3-methyl-4.7-dichloroquinoline (M. P. 87°) are heated with 35 g. of 1-diethylamino-4-aminopentane and 10 g. of phenol for 15 hours in an oil bath to 200–220°. To the melt there are added 100 cc. of a 20% sodium lye, and the whole is extracted three times with ether. From the combined ethereal extracts the base is extracted with a 20 per cent acetic acid, the acetic acid solution is rinsed once with ether and now sodium lye is added in order to precipitate the free base. The precipitated base is dissolved in ether, the ethereal solution rinsed, the ether removed by distillation and the residue fractionated under reduced pressure. The 3-methyl-4-(5'-diethylaminopentyl-2'-amino)-7-chloroquinoline passes over at 220–230°/0.5 mm.

For practical purposes it is sufficient to use the crude 3-methyl-4.7-dichloroquinoline containing also the isomeric 3-methyl-4.5-dichloroquinoline, which is obtained by condensation of m-chloroaniline with α-oxalo-propionic acid diethylester, subsequent saponification, decarboxylation and chlorination.

In an analogous way the 7-bromine compound (B. P. 230°/0.5 mm.) and the 7-iodine compound (B. P. 210–225°/0.05 mm.) are obtained (reaction temperature about 160°).

From 4.6.7-trichloroquinoline and 1-diethylamino-4-aminopentane the 4-(5'-diethylaminopentyl-2'-amino)-6.7-dichloroquinoline (B. P. 210–220°/0.4 mm.) is obtained.

From 4.5.7-trichloroquinoline and 1-diethylamino-4-aminopentane the 4-(5'-diethylaminopentyl-2'-amino)-5.7-dichloroquinoline (B. P. 210–220°/0.4 mm.) is obtained.

From 3-ethoxy-4.7-dichloroquinoline (M. P. 97°) and 1-diethylamino-4-aminopentane the 3-ethoxy-4-(5'-diethylaminopentyl-2'-amino)-7-chloroquinoline (B. P. 210–215°/0.07 mm.) is obtained.

From 3.5.6.7-tetramethyl-4-chloroquinoline (M. P. 72°) and 1-diethylamino-4-aminopentane the 3.5.6.7-tetramethyl-4-(5'-diethylaminopentyl-2'-amino)-quinoline (B. P. 228°/0.9 mm.) is obtained.

From 3-phenyl-4.7-dichloroquinoline (M. P. 119°) and 1-diethylamino-4-aminopentane the 3-phenyl-4-(5'-diethylaminopentyl-2'-amino)-7-chloroquinoline (B. P. 230°/0.2 mm.) is obtained.

From 3-methyl-4.5.7-trichloroquinoline (M. P. 151°) and 1-diethylamino-4-aminopentane the 3-methyl-4-(5'-diethylaminopentyl-2'-amino)-5.7-dichloroquinoline (B. P. 220–230°/0.04 mm.) is obtained.

From 4.7-dichloro-6-methylquinoline (B. P. 137°/3 mm.) and 1-diethylamino-4-aminopentane the 4-(5'-diethyl-aminopentyl-2'-amino)-6-methyl-7-chloroquinoline (B. P. 200–210°/0.03 mm.) is obtained.

From 3-methyl-4.7-dichloro-6-methylmercaptoquinoline (M. P. 100°) and 1-diethylamino-4-aminopentane the 3-methyl-4-(5'-diethylaminopentyl-2'-amino)-6-methylmercapto-7-chloroquinoline (B. P. 230°/0.5 mm.) is obtained.

*Example 3*

19.8 g. of 4.7-dichloroquinoline (M. P. 93°) are heated with 12.2 g. of aminoethanol for 15 hours in an oil bath to 170–180°. To the melt, after cooling, there are added 100 cc. of a sodium hydroxide solution. The precipitated 4-β-hydroxyethyl-amino-7-chloroquinoline is filtered with suction. It melts at 214° when recrystallized from methanol.

10 g. of this compound are refluxed with 30 cc. of phosphorus oxychloride for 2 hours. Then excess phosphorus oxychloride is distilled off under reduced pressure. Ammonia is added to the residue. The 4-(β-chloroethylamino)-7-chloroquinoline obtained is extracted with ether. It melts at 154° and yields, upon reaction with diethylamine in a sealed tube at 140°, 4-diethylamino-ethylamino-7-chloroquinoline (B. P. 190–195°/3 mm.), compare example 1, paragraph 2.

*Example 4*

1 g. of sodium is dissolved in 20 g. of diethylaminoethanol and 100 cc. of decahydronaphthalene. Thereto there are added 3 g. of 4-(β-chloroethylamino)-7-chloroquinoline. Then the whole is heated for 15 hours in an oil bath to 200°. The 4-(β-dithylaminoethoxyethylamino)-7-chloroquinoline formed is dissolved in diluted acetic acid and the solution washed twice with ether. From the acetic acid solution the base is freed with sodium hydroxide solution; then it is dissolved in ether (B. P. 230–240°/0.5 mm.).

*Example 5*

12 g. of 4-(β-chloroethylamino)-7-chloroquinoline are heated with 8.5 g. of piperidine for 15 hours in a sealed tube at 150° C. Then the mixture is dissolved in diluted acetic acid and twice extracted with ether. The 4-[β-piperidino-(N)-ethyl-amino]-7-chloroquinoline is freed from the acetic acid solution with sodium hydroxide solution and dissolved in ether. After the ether has been removed the base boils at 230–240°/1 mm.

*Example 6*

A solution of 1 g. of sodium in 20 g. of β-diethylaminoethylmercaptane, 100 cc. of xylene and 3 g. of 4-(β-chloroethylamino)-7-chloroquinoline is refluxed for 15 hours. The reaction mixture is dissolved in diluted acetic acid and the acetic acid solution washed with ether. From the acetic acid solution the base is precipitated with sodium hydroxide solution. It is dissolved in ether. From ether-petroleum ether it crystallizes in colorless scales (M. P. 85°). It shows the composition of the 4-β-diethylaminoethyl-mercapto-ethylamino)-7-chloroquinoline.

*Example 7*

10 g. of 4.7-dichloroquinoline are heated with 50 g. of phenol in an oil bath to 200°. Through this melt a moderate current of ammonia is passed for 2—3 hours. Then it is dissolved in diluted acetic acid. In order to remove the phenol the acetic acid solution is washed with ether. From the acetic acid solution the 4-aminoquinoline obtained is precipitated with sodium hydroxide solution and dissolved in ether. The compound melting at 147°, is obtained therefrom. The amino group is acetylated with acetic anhydride.

To a solution of 0.5 g. of sodium in 10 g. of diethylaminoethanol and 50 cc. of decahydronaphthalene are added 3.5 g. of 4-acetylamino-7-chloroquinoline (M. P. 193°). The mixture is refluxed for 40 hours. The 4-diethylaminoethylamino-7-chloroquinoline is dissolved in diluted acetic acid, the solution washed with ether, the base separated from the acetic acid solution with sodium hydroxide solution and then dissolved in ether. The 4-diethylaminoethylamino-7-chloroquinoline (B. P. 190–195°/3 mm.) is obtained therefrom.

*Example 8*

10 g. of 3-methyl-4.7-dichloroquinoline are heated with 15 g. of p-dimethylaminoethoxyaniline, 5 g. of phenol and 0.2 g. of sodium iodide for 18 hours to 180°. Then sodium hydroxide solution is added to the mixture, the bases are extracted with methylene chloride, the methylene chloride solution is agitated with diluted acetic acid whereby the bases are dissolved by the acetic acid. Sodium hydroxide solution is added to the acetic acid solution. The mixture thus obtained is extracted with methylene chloride, the methylene chloride is evaporated and the residue by heating it up to 200° at a pressure of 4 mm. freed from bases having a low boiling point. The residue is dissolved in acetone and a solution of 2.4-dihydroxybenzoic acid dissolved in acetone is added. The 2.4-dihydroxy benzoate of the 3-methyl-4-(p-diethylaminoethoxyphenylamino) - 7 - chloroquinoline precipitates as a yellow powder.

*Example 9*

2.5 g. of phenol and 2.5 g. of 3-methyl-4.7-dichloroquinoline are refluxed with 3.8 g. of 4-amino-1-phenoxybutane (B. P. 112°/4 mm.) and a small quantity of potassium iodide at 180° for 15 hours. When the reaction has been finished the melt is introduced into about 15 cc. of a 33 per cent sodium hydroxide solution with ether. The ethereal solution is extracted with and repeatedly extracted with diluted hydrochloric acid and to the hydrochloric acid solution sodium acetate solution is added until a reaction neutral to Congo red is produced. On standing 3-methyl-4.7-dichloroquinoline being not converted crystallizes from this solution. After separating the last mentioned substance the acetic acid solution is made alkaline with sodium hydroxide solution and extracted with ether. After evaporating the ether, the 3-methyl-4-phenoxybutylamino-7-chloroquinoline is obtained as viscous oil (yield 3 g.).

This substance is refluxed with 20 cc. of hydrobromic acid (d=1.5) and then evaporated to dryness in vacuo at 100°, whereby the phenol split off by the hydrobromic acid passes over. About 50 cc. of liquid ammonia are added to the residue and the whole heated for a short time (about 1 hour) in an autoclave at 60°. When the reaction has been finished the excess ammonia is evaporated and the residue dissolved in diluted hydrochloric acid. To the solution is added sodium acetate solution until a reaction neutral to Congo red is produced and extracted with ether. The aqueous solution is made alkaline and repeatedly extracted with ether. The ethereal solution is then dried with potassium carbonate, filtered and the hydrochloric acid salt of the 3-methyl-7-chloro-4-(4'-aminobutyl)-aminoquinoline is precipitated from the filtrate with ethereal hydrochloric acid. It is a yellow-colored substance being easily soluble in water. The base has the boiling point 212°/2 mm. and represents a yellow-colored oil which solidifies when strongly cooled.

We claim:

1. Quinoline compounds containing as substituents at least in the 4-position an amino group which is substituted by a basic radical containing an aliphatically bound amino group, and in the 7-position a substituent selected from the group consisting of halogen atoms and the methyl group, but containing no substituent in the 2-position, which quinoline compounds are in the form of their salts with mineral and lower organic acids soluble in water, but in general insoluble in water in the form of their salts with aromatic hydroxycarboxylic acids.

2. Quinoline compounds containing as substituents at least in the 4-position an amino group which is substituted by a basic radical containing an aliphatically bound amino group, and in the 7-position a halogen atom, but containing no substituent in the 2-position, which quinoline compounds are in the form of their salts with mineral and lower organic acids soluble in water, but in general insoluble in water in the form of their salts with aromatic hydroxycarboxylic acids.

3. Quinoline compounds containing as substituents at least in the 4-position an amino group which is substituted by a dialkylaminoalkyl radical, and in the 7-position a substituent selected from the group consisting of halogen atoms and the methyl group, but containing no substituent in the 2-position, which quinoline compounds are in the form of their salts with mineral and lower organic acids soluble in water, but in general insoluble in water in the form of their salts with aromatic hydroxycarboxylic acids.

4. Quinoline compounds containing as substituents at least in the 4-position an amino group which is substituted by a dialkylaminoalkyl radical, and in the 7-position a halogen atom, but containing no substituent in the 2-position, which quinoline compounds are in the form of their salts with mineral and lower organic acids soluble in water, but in general insoluble in water in the form of their salts with aromatic hydroxycarboxylic acids.

5. 3-Alkylquinolines containing as further substituents at least in the 4-position an amino group which is substituted by a basic radical containing an aliphatically bound amino group, and in the 7-position a substituent selected from the group consisting of halogen atoms and the methyl group, but containing no substituent in the 2-position, which quinoline compounds are in the form of their salts with mineral and lower organic acids soluble in water, but in general insoluble in water in the form of their salts with aromatic hydroxycarboxylic acids.

6. 3-Alkylquinolines containing as further substituents at least in the 4-position an amino group which is substituted by a basic radical containing an aliphatically bound amino group, and in the 7-position a halogen atom, but containing no substituent in the 2-position, which quinoline compounds are in the form of their salts with mineral and lower organic acids soluble in water, but in general insoluble in water in the form of their salts with aromatic hydroxycarboxylic acids.

7. 3-Alkylquinolines containing as further substituents at least in the 4-position an amino group which is substituted by a dialkylaminoalkyl radical, and in the 7-position a substituent selected from the group consisting of halogen atoms and the methyl group, but containing no substituent in the 2-position, which quinoline compounds are in the form of their salts with mineral and lower organic acids soluble in water, but in general insoluble in water in the form of their salts with aromatic hydroxycarboxylic acids.

8. 3-Alkylquinolines containing as further substituents at least in the 4-position an amino group which is substituted by a dialkylaminoalkyl radical, and in the 7-position a halogen atom, but containing no substituent in the 2-position, which quinoline compounds are in the form of their salts with mineral and lower organic acids soluble in water, but in general insoluble in water in the form of their salts with aromatic hydroxycarboxylic acids.

9. A 3-alkyl-4-dialkylaminoalkylamino-7-halogen-quinoline.

10. A 3-methyl-4-dialkylaminoalkylamino-7-halogen-quinoline.

11. A 3-alkyl-4-dialkylaminopentylamino-7-halogen-quinoline.

12. A 3-methyl-4-dialkylaminopentylamino-7-halogen-quinoline.

13. The process which comprises reacting upon a 4-halogen quinoline which contains as further substituent a halogen atom at least in the 7-position, but containing no substituent in the 2-position, with a polyamine containing at least one non-tertiary amino group.

14. The process which comprises reacting upon a 4-halogen quinoline which contains as further substituent a halogen atom at least in the 7-position, but containing no substituent in the 2-position, with an alkylenediamine containing at least one non-tertiary amino group.

15. The process which comprises reacting upon a 3-alkyl-4.7-dihalogen quinoline with a polyamine containing at least one non-tertiary amino group.

16. The process which comprises reacting upon a 3-alkyl-4.7-dihalogen quinoline with an alkylenediamine containing at least one non-tertiary amino group.

17. The process which comprises reacting upon a 3-methyl-4.7-dihalogen quinoline with an alkylenediamine containing at least one non-tertiary amino group.

18. The process which comprises reacting upon a 3-methyl-4.7-dihalogen quinoline with a diethylaminoalkylamine containing a non-tertiary amino group.

19. 3-methyl-4-(5'- diethylamino - pentyl - 2'-amino)-7-chloroquinoline.

20. 3-methyl-4-(5'- diethylamino - pentyl - 2'-amino)-7-iodoquinoline.

21. 4 - (5'-diethylamino-pentyl - 2'- amino)-7-chloroquinoline.

HANS ANDERSAG.
STEFAN BREITNER.
HEINRICH JUNG.